Dec. 23, 1947. A. M. GRAHAM 2,433,042
METHOD OF MANUFACTURING WELL DRILL PIPE PROTECTORS
Filed March 20, 1944
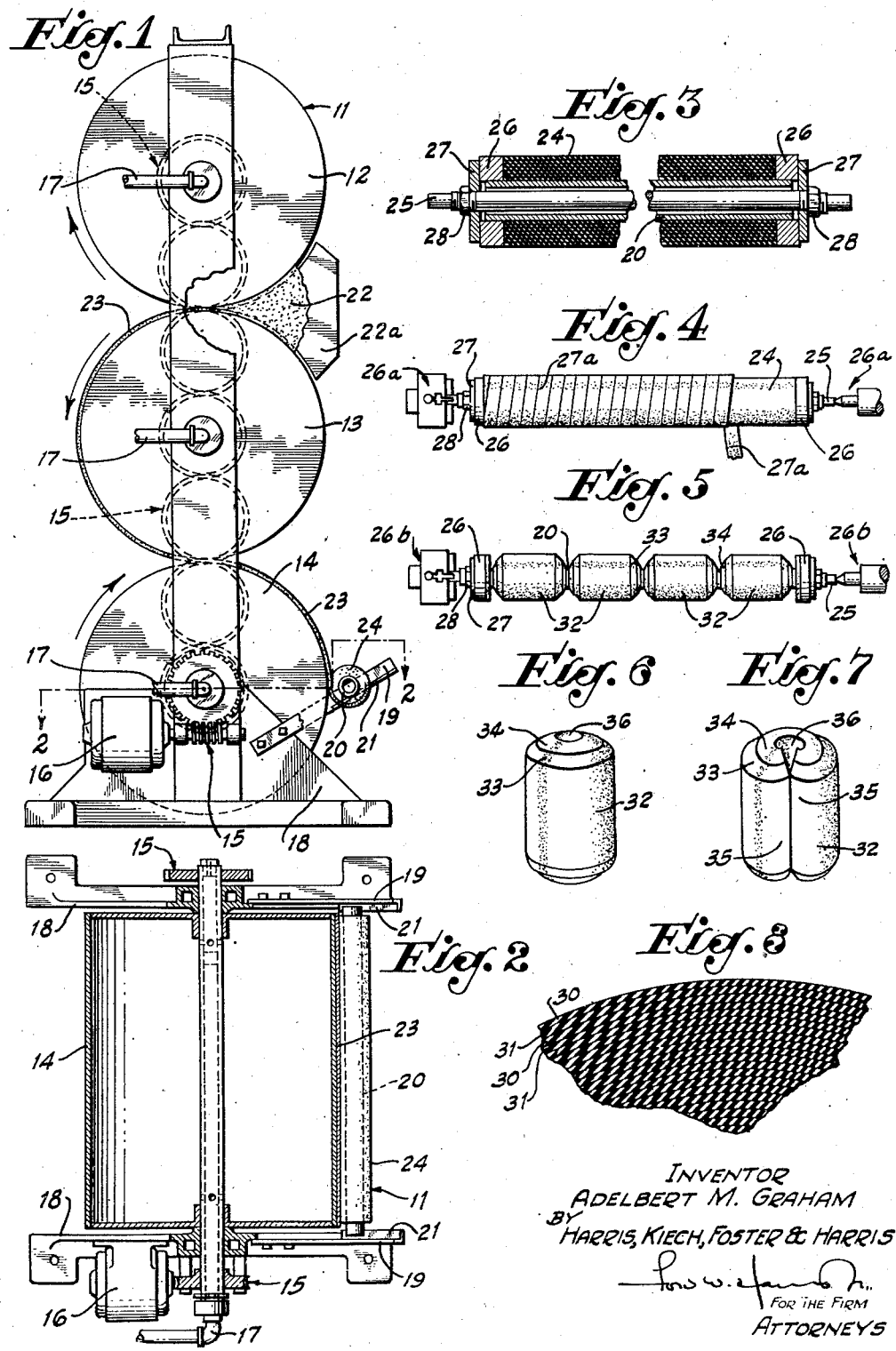
INVENTOR
ADELBERT M. GRAHAM
BY
HARRIS, KIECH, FOSTER & HARRIS
FOR THE FIRM
ATTORNEYS Patented Dec. 23, 1947

2,433,042

UNITED STATES PATENT OFFICE 2,433,042

METHOD OF MANUFACTURING WELL DRILL PIPE PROTECTORS

Adelbert M. Graham, Paulding, Ohio, assignor, by mesne assignments, to Thermoid Company, Trenton, N. J., a corporation of Delaware Continuation of application Serial No. 421,482, December 3, 1941, which is a division of application Serial No. 389,759, April 22, 1941. This application March 20, 1944, Serial No. 527,283

7 Claims. (Cl. 18—53)

This application is a continuation of my application Serial No. 421,482, filed December 3, 1941, entitled "Method of manufacturing a well drill pipe protector," which is a division of my application Serial No. 389,759, filed April 22, 1941, entitled "Well drill pipe protector."

This invention relates to a method of manufacturing cylindrical drill pipe protectors.

It is one object of this invention to provide a method of manufacturing drill pipe protectors such that they will be tough and resistant, as respects both abrasion and laceration, to blows against the sides of the protector due to lateral movement of the drill pipe upon which it is mounted which causes it to bang against the well casing, or due to any other causes.

It is another object of the invention to provide a method of manufacturing drill pipe protectors such that they will securely grip the drill pipe and not be easily displaced longitudinally thereof.

It is another object of the invention to provide a method of manufacturing drill pipe protectors of the one-piece, continuously walled, cylindrical type, such that they may be diametrically enlarged by an expanding tool for placement upon a drill pipe without being deformed or otherwise damaged during the expanding operation.

It is another object of the invention to provide a method of manufacturing drill pipe protectors with the above recited qualities which will be inexpensive, efficient, and easy of execution.

A drill pipe protector and a method of making it have been set forth in detail in the following description and the accompanying drawing, which shows one embodiment of the invention. It will be understood that there may be substantial modifications of the construction of the protector and of its method of manufacture without departing from the principles of this invention. The scope of the invention is to be determined by the appended claims and not by the specific descriptive matter relating to the particular embodiment of the invention herein set forth.

In the drawing, which is for illustrative purposes only,

Fig. 1 is an end elevation of a machine for making the cylinders of uncured rubber from which the protectors are fabricated.

Fig. 2 is a horizontal section taken along the line 2—2 of Fig. 1.

Fig. 3 is a longitudinal section of one of the cylinders of uncured rubber mounted on a mandrel and partially prepared for the curing operation.

Fig. 4 shows the rubber cylinder on a mandrel in process of undergoing the final treatment preparatory to the curing operation.

Fig. 5 shows the cylinder after it has been cured and at the completion of the sizing operation.

Fig. 6 is a perspective view of the finished drill pipe protector.

Fig. 7 is a perspective view showing the shape assumed by the protector when it is split longitudinally along one radial plane only.

Fig. 8 is an enlarged, fragmentary, transverse, sectional view of the wall of the finished drill pipe protector.

In Fig. 1, the numeral 11 designates an electrically powered calender roll assembly which is intended to be typical of any similar equipment for the forming of uncured compounded rubber stock into a relatively thin continuous sheet. As shown in the drawing, this calendar assembly comprises three hollow cylindrical rolls 12, 13, and 14 geared by gearing mechanism generally indicated by the number 15 and powered by the motor 16 to drive the upper roll 12 and lower roll 14 in a clockwise direction and the intermediate roll 13 in a counterclockwise direction. The rolls 12, 13, and 14 are preferably of the same diameter and are heated by any suitable means, such as steam pipes 17.

To a frame structure 18 upon which the rolls 12, 13, and 14 are mounted is secured a pair of angle-iron rails 19 in such position that a rail 19 is disposed longitudinally beyond and adjacent each of the ends of the lower roll 14 and at a small angle to the horizontal, projecting upwardly and outwardly of the surface of the lower roll 14 at a point on the surface of the roll which lies approximately in the horizontal diametral plane thereof.

A hollow spindle 20 slightly longer than the roll 14 is disposed to rest parallel to the roll 14 with its ends loosely supported by flanges 21 on the rails 19.

Masses 22 of uncured rubber stock, compounded to produce a cured product of sufficient hardness to satisfactorily resist abrasion and of sufficient toughness or pliability to satisfactorily resist compressive blows and tensile stresses without fracture, are manually thrown from the right into the space between the convergently moving surfaces and the calender rolls 12 and 13. The stock is pulled between the rolls, which are spaced apart a small distance, as, for instance, $\frac{1}{32}$", and there flattened and drawn out into a sheet 23 which is carried downward and to the left by the roll 13. A pair of vertical plates 22a, only one of which is shown in Fig. 1 of the drawing, are mounted at the two ends respectively of the rolls 12 and 13 to retain the masses 22 of rubber in position lengthwise of the rolls and determine the width of the sheet 23. The rolls 13 and 14 are similarly spaced apart $\frac{3}{32}''$. When the rubber sheet 23 reaches the lowermost level of the roll 13, it is transferred to the surface of the roll 14 and led by that roll to the hollow mandrel 20, on which it is spirally wound in a counterclockwise direction to form a rubber cylinder 24, the mandrel being slowly pushed upwardly in the rails 19 as it rotates and as the diameter of the rubber cylinder 24 upon it is increased.

The mandrel 20, prior to its disposition upon the rails 19, is coated with a soapstone solution. When the cylinder 24 has reached the desired diameter, which we shall assume for purposes of a concrete illustration to be $4\frac{1}{4}''$, the sheet of material is cut transversely upon the roller 14 just in advance of the hollow spindle 20, and the spindle with the rubber cylinder 24 thereon is removed from the calender machine.

It will of course be understood that this invention may be embodied in manufacturing protectors of widely varying diameters and lengths, and that the thickness of the sheet 23 and the diameter of the hollow spindle 20 may have corresponding variations. However, to bring out approximately the relationships involved in the invention, there has been selected for description in the specification and in the drawing a drill pipe protector for use on a drill pipe of $4\frac{1}{2}''$ outside diameter. The mandrel for the manufacture of such a protector is about $2\frac{1}{4}''$ outside diameter. The sheet 23 of rubber may then be about $\frac{3}{32}''$, although it may vary widely from this thickness and yet produce a satisfactory protector for a $4''$ drill pipe.

The sheet 23 is wound upon the mandrel 20 at the temperature given it by the steam heated calender rolls. When the mandrel 20 is removed from the calender machine, it cools, and the laminated wall of the cylinder 24 as it cools has set up within it circumferentially directed tensile stresses which cause it to grip the mandrel with great force.

After the mandrel is removed from the calender machine 11, a rod 25 somewhat longer than the mandrel 20 and with threaded ends is inserted within the mandrel, and collars 26 are clamped against the ends of the laminated rubber cylinder 24 by means of washers 27 and nuts 28.

The rod 25 is then placed in a lathe 26a, and the cylinder 24 is externally and spirally wound with a fabric tape 27a, this tape being wetted before being applied to the uncured protector. The rod 25 with the mandrel and taped cylinder 24 assembled thereon is then placed in a vulcanizer, where the rubber cylinder 24 is given an open cure, during which the tape 27a gives up its moisture, due to the elevated temperature of the vulcanizer, and shrinks longitudinally, thus tightening its wrap on the rubber and subjecting it to pressure over and above the steam pressure of the vulcanizer.

Upon removal from the vulcanizer, the rod 25 is placed in a lathe 26b, where the cylinder 24 is turned down to a true cylindrical surface of approximately $4\frac{1}{4}''$ diameter, and the cylinder is cut radially inward at several points to provide a plurality of separate cylinders 32 of proper length to constitute drill pipe protectors. Preferably, these shorter cylinders 32, which are now the finished protectors, are cut to provide end faces characterized by an outer annular beveled surface 33 and an inner annular beveled surface 34 more nearly perpendicular to the axis of the protector than the surface 33. When the drill pipe protector is placed in position upon a drill pipe, these beveled surfaces prevent lodgment of sand, grit, or other fine matter against the drill pipe, which, when combined with water and disposed against the drill pipe, may be the means of cutting an annular groove in the drill pipe. The rod 25, mandrel 20, and the four completed drill pipe protectors 32 are removed from the lathe 26b, the collars 26, the rod, and the mandrel are disassembled, and the protectors 32 are removed from the mandrel 20 by means of a hydraulic press. The fact that the mandrel 20 is coated with a soapstone solution before receiving the windings of the sheet of rubber greatly facilitates the removal of the protectors without damage thereto.

After removal, the bore of each protector is about $\frac{1}{16}''$ less in diameter than the diameter of the mandrel 20, showing that the molecules of the rubber laminae of the protector when the protector is in position upon the mandrel are in a strained condition which sets up circumferentially acting tensile stresses in the laminae, and that these stresses, when the protector is removed from the mandrel, act to reduce the diameter of the protector.

However, the condition of the molecules of the laminae of the protector is still characterized by a residual strain after removal of the protector from the mandrel 20, for if the protector wall is split longitudinally on a radial plane, the stresses set up by this residual molecular strain of the rubber laminae cause wall portions 35 adjacent the cleavage plane to bend inwardly, as shown in Fig. 7 of the drawing.

It will thus be seen that when one of these protectors is expanded until its bore 36 is twice its normal size and the protector is applied to a drill pipe, the constrictive pressure of the protector upon the drill pipe is such that the protector is not movable longitudinally along the drill pipe by any force likely to be brought to bear upon the protector under normal conditions.

In applying one of these protectors to a drill pipe, it is the usual practice to radially enlarge the protector until its diameter is considerably more than twice its normal diameter. While thus expanded, the protector is slipped over a hollow storage or handling mandrel of a larger diameter than the drill pipe. When it is desired to use the drill pipe protector, the storage mandrel is slipped over the drill pipe until it reaches the desired point of application, and the protector is then forced longitudinally from the storage mandrel onto the drill pipe. A protector constructed in accordance with the method of this invention is well adapted to withstand the hard usage to which it is subjected when thus expanded to be applied to the storage mandrel and when forced from the storage mandrel onto the drill pipe.

If fracture, rupture, or any other kind of internal structural disintegration develops in any one of the laminae of rubber, since the two laminae contiguous to the outer and inner faces of such a lamina, respectively, are molecularly non-homogeneous therewith across the bonding joints 31, the disintegrating process stops at the cylindrical surfaces of the laminae at the joints. In the case of a non-laminated protector, it is obvious that a zone of disintegration will tend to grow and spread in all directions.

For the same reason, when the protector is in use, cuts, gouges, and lacerations of any kind developing in the outer surface portions of the protector, due to blows externally applied to the protector, are inhibited from inward growth through the wall of the protector.

Fig. 8 illustrates the laminated character of the protector wall. Each lamina 30 is homogeneous in molecular structure. This homogeneity is not continuous across the joints 31. At the surface of the bonding joint 31 between two juxtaposed laminae, the molecules of the two laminae are cohesively related to each other, but this cohesive relationship is the kind which results from the superimposing of one hot rubber sheet upon another hot rubber sheet and is not the kind which is characteristic of the molecular structure of the body of the lamina. In their heated condition, the sheets are sufficiently "tacky" to establish a satisfactory bonding relationship between the two juxtaposed laminae.

It will be observed that in the protector shown and described herein the protector wall comprises approximately thirty laminae. It is characteristic of this invention that the protector wall thereby produced comprises a relatively large number of relatively thin laminae. If the number of laminae is reduced to two or three of correspondingly greater thickness, the advantages of the invention are correspondingly reduced. While the invention is not limited to any definite number of laminae, if their number is less than about ten, the advantages of the invention are greatly reduced, and the performance of the protector becomes much less satisfactory.

I claim as my invention:

1. A process of making a protector adapted to be placed on a drill pipe to protect the pipe from abrasion when the pipe is rotated in an oil well, which comprises: winding a thin sheet of uncured rubber, of sufficient hardness to satisfactorily resist abrasion and of sufficient toughness and pliability to satisfactorily resist compressive blows and tensile stresses without fracture, on a mandrel, said rubber being wound spirally on the mandrel to form a cylinder of the proper outside diameter and of sufficient length to form a plurality of protectors, said sheet being wound on said mandrel at a superatmospheric temperature, so that as it cools the rubber contracts; winding the exterior of said cylinder with a fabric tape which is wound helically on the outside of said cylinder to put the material of said cylinder under compression, said tape being thoroughly wet when so wound so that it will shrink due to evaporation of water during subsequent vulcanization, thus increasing compression of said material due to the shrinkage of said fabric; vulcanizing the cylinder so formed; and cutting the cylinder into suitable lengths to form individual protectors.

2. A process of making a ring-shaped element, which includes the steps of: winding a thin sheet of uncured rubber, of sufficient hardness to satisfactorily resist abrasion and of sufficient toughness and pliability to satisfactorily resist compressive blows and tensile stresses without fracture, on a core element, said rubber being wound spirally on the core element to form a cylinder of the proper outside diameter and of sufficient length to form a plurality of ring-shaped elements, said sheet being wound on said core element at a superatmospheric temperature, so that as it cools the rubber contracts; winding the exterior of said cylinder with a fabric tape which is wound helically on the outside of said cylinder to put the material of said cylinder under compression, said tape being thoroughly wet when so wound so that it will shrink due to evaporation of water during subsequent vulcanization, thus increasing the compression of said material due to the shrinkage of said fabric; vulcanizing the cylinder so formed; and cutting the cylinder into suitable lengths to form individual ring-shaped elements.

3. A process of making a ring-shaped element, which includes the steps of: winding a thin sheet of uncured rubber, of sufficient hardness to satisfactorily resist abrasion and of sufficient toughness and pliability to satisfactorily resist compressive blows and tensile stresses without fracture, on a cylindrical element, said sheet being wound on said cylindrical element at a superatmospheric temperature to form a cylinder; winding the exterior of said cylinder with a plurality of layers of a shrinkable fabric to put the material of said cylinder under compression, said fabric being thoroughly wet when so wound so that it will subsequently shrink due to evaporation of moisture therefrom, thus increasing the compression of said material due to the shrinkage of said fabric; and vulcanizing the cylinder so formed.

4. A process of making a ring-shaped element, which includes the steps of: winding a thin sheet of a flexible material including a thermosetting material on a mandrel to form a cylinder; winding the exterior of said cylinder with a plurality of layers of a shrinkable fabric to put the material of said cylinder under compression, said fabric being thoroughly wet when so wound so that it will subsequently shrink due to evaporation of moisture therefrom, thus increasing the compression of said material due to the shrinkage of said fabric; evaporating moisture from said fabric to cause said shrinkage; and removing said cylinder from said mandrel.

5. A process of making an element which includes the steps of: winding a sheet of thermosetting material on a mandrel to form an element conforming in shape to the periphery of the mandrel; winding the exterior of said element with a layer of a shrinkable fabric so as to put the material of said element under compression, said fabric being thoroughly wet when wound so that it will subsequently shrink upon evaporation of moisture therefrom, thus increasing the compression of said material due to the shrinkage of said fabric; evaporating moisture from said fabric to cause said shrinkage and thereby increase substantially the radial compression on said element; and removing said element from said mandrel.

6. A process of making an element, which includes the steps of: winding a sheet of thermosetting material on a mandrel to form an element conforming in shape to the periphery of the mandrel; winding the exterior of said element with a layer of a shrinkable fabric so as to put the material of said element under compression, said fabric being thoroughly wet when wound so that it will subsequently shrink upon evaporation of moisture therefrom, thus increasing the compression of said material due to the shrinkage of said fabric; evaporating moisture from said fabric to cause said shrinkage and thereby increase substantially the radial compression on said element; subjecting said element to a heat treatment while under such compression so as to heat cure the material thereof; and removing said element from said mandrel.

7. A process of making an element, which includes the steps of: winding a relatively thin sheet of thermo-setting material on a mandrel to form an element conforming in shape to the periphery of the mandrel and composed of a relatively large number of separate superimposed laminae adapted to be bonded together by a heat cure; winding the exterior of said element with a layer of a shrinkable fabric so as to put the material of said element under compression, said fabric being thoroughly wet when wound so that it will subsequently shrink upon evaporation of moisture therefrom, thus increasing the compression of said material due to the shrinkage of said fabric; evaporating moisture from said fabric to cause said shrinkage and thereby increase substantially the radial compression on said element; subjecting said element to a heat cure while under such compression so as to heat cure the material thereof and bond said laminae together; and removing said element from said mandrel.

ADELBERT M. GRAHAM.

REFERENCES CITED

The following references are of record in the file of this patent:

UNITED STATES PATENTS

| Number | Name | Date |
| --- | --- | --- |
| 962,054 | Rowley et al. | June 21, 1910 |
| 1,424,386 | Staner | Aug. 1, 1922 |
| 1,900,298 | Morris | Mar. 7, 1933 |
| 2,115,543 | Thackray | Apr. 26, 1938 |
| 2,126,733 | Catt | Aug. 16, 1938 |